United States Patent
Ishii (10) Patent No.: US 7,095,857 B2
(45) Date of Patent: Aug. 22, 2006

(54) KEY DISTRIBUTION SYSTEM FOR PROTECTION OF ROUTE-UPDATE NOTIFICATION IN MICROMOBILITY NETWORKS

(75) Inventor: Shuji Ishii, Tokyo (JP)

(73) Assignee: NEC Corporation, Tokyo (JP)

( * ) Notice: Subject to any disclaimer, the term of this patent is extended or adjusted under 35 U.S.C. 154(b) by 839 days.

(21) Appl. No.: 10/096,943

(22) Filed: Mar. 14, 2002

(65) Prior Publication Data

US 2002/0131602 A1     Sep. 19, 2002

(30) Foreign Application Priority Data

Mar. 19, 2001   (JP) .............................. 2001-077717

(51) Int. Cl.
*H04L 9/00* (2006.01)
(52) U.S. Cl. .................. 380/278; 370/332; 455/428
(58) Field of Classification Search ............. 380/278; 370/332; 455/428
See application file for complete search history.

(56) References Cited

U.S. PATENT DOCUMENTS 6,625,135 B1 * 9/2003 Johnson et al. ............ 370/332

FOREIGN PATENT DOCUMENTS

EP      1 011 241 A1    6/2000

OTHER PUBLICATIONS

Perkins, Charles; Mobile Networking Through Mobile IP, IEEE Internet Computing, vol. 1998, vol. 2, Issue 1 (Jan. 1998), pp. 58-69.*

R. Ramjee et al., "Hawaii: A Domain-based Approach for Supporting Mobility in Wide-area Wireless Networks," Conference Proceedings Article, 1999, pp. 283-292.

* cited by examiner

*Primary Examiner*—Gilberto Barron, Jr.
*Assistant Examiner*—Nima Khomassi
(74) *Attorney, Agent, or Firm*—Young & Thompson (57) ABSTRACT

This invention provides a key distribution system for protecting route-update notifications which overcomes the problem of scalability in the processing of authentication information and achieves a shortening of the time required to verify legitimacy. Its context is a key distribution system for protecting route-update notifications, which distributes, to the routers in a mobile communication network, the authentication information established for mobile terminals, which is used by the routers to authenticate mobile terminal route-update notifications that are communicated from the mobile terminals after encryption. In this context, the invention comprises a top-level router for managing the authentication information of all mobile terminals and for distributing it in response to requests from the routers. These routers are provided with route information management means for holding the authentication information of the mobile terminals, verifying the route-update notifications communicated from these mobile terminals, and managing their route information. This route information management means is provided with means which, if the route information management means does not hold the authentication information corresponding to an originating mobile terminal, requests and acquires the authentication information in question from the top-level router when it receives a route-update notification.

15 Claims, 4 Drawing Sheets

KEY DISTRIBUTION SYSTEM FOR PROTECTION OF ROUTE-UPDATE NOTIFICATION IN MICROMOBILITY NETWORKS

BACKGROUND OF THE INVENTION

1. Field of the Invention

The present invention relates to mobile communication networks, and in particular to a key distribution system for protection of route-update notifications, this system facilitating appropriate processing, at network nodes, of route-update notifications from user terminals.

2. Description of Related Art

The conventional mobility-supporting system network that the present invention is designed to improve is defined in proposed standards such as Cellular IP (see A. G. Valko, "Cellular IP—A New Approach to Internet Host Mobility", ACM Computer Communication Review, January 1999).

Figure 4:
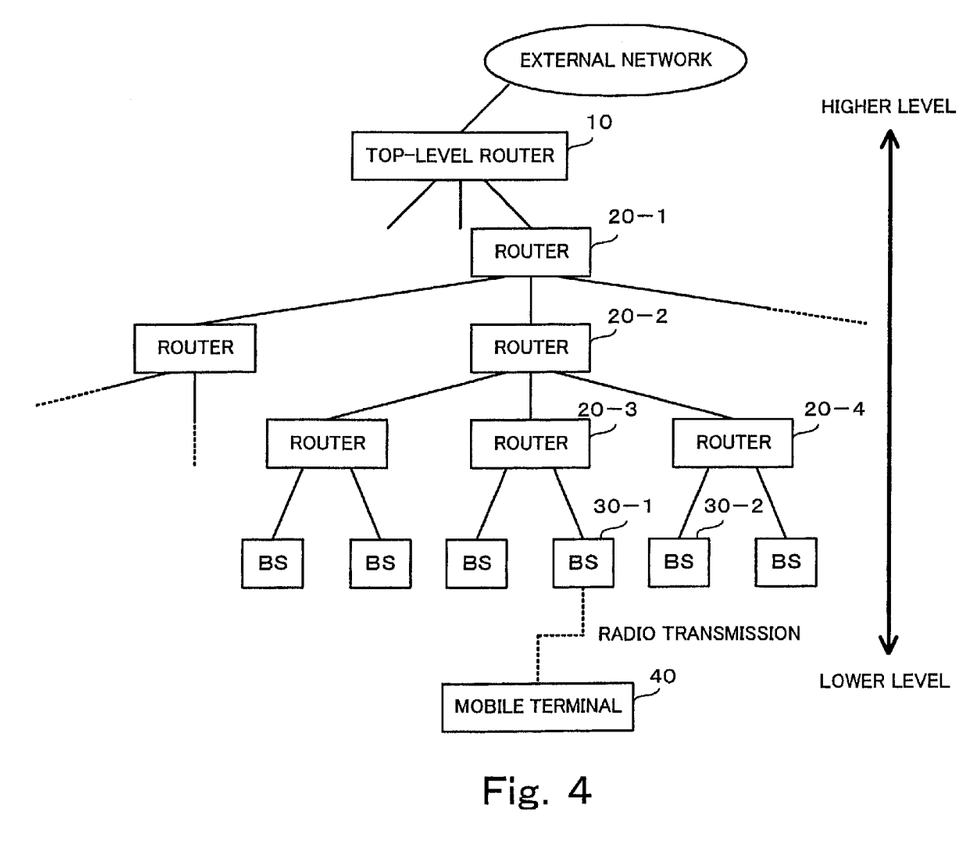
FIG. 4 shows an example of the constitution of a mobile communication network.

As shown in FIG. 4, in a mobility-supporting system network in which this conventional technology is applied, the fixed nodes are connected by transmission devices in a tree hierarchy. Base stations are connected to the nodes at the base of the tree, and communicate with mobile terminals over radio channels.

The root node of the tree is connected to an external network. All packets that mobile terminals exchange with the external network are sent and delivered via this node. While a mobile terminal is connected to a base station of this mobility-supporting system network, its accessibility from the external network using the same address is guaranteed irrespective of the base station to which it is connected.

The route to a mobile terminal is held separately by each router, and routing responds to movement of a mobile terminal in the following way. Namely, a mobile terminal transmits a route-update notification every time it moves. The route-update notification is relayed from the lowest-level base station to which the mobile terminal is connected, progressively upwards through the hierarchy to the highest-level router. As a result, the route is updated at those routers through which the update notification has passed.

In order to increase network fault resistance and expandability, soft-state route information is employed. Namely, a route automatically expires when a predetermined time interval elapses since its formation. Mobile terminals are configured to hold a route independently. That is to say, when a mobile terminal remains at one location, it intermittently transmits a route-update notification in order to maintain the existing route.

Delivery of packets from the external network to a mobile terminal is performed by routers as follows. When a packet arrives from a higher-level network interface, a route information retrieval unit retrieves route information on the basis of the packet destination address, determines the destination network interface to which to output the packet, and sends the packet from that interface. If the forwarding address cannot be determined from the route information retrieved on the basis of the packet destination address, the packet is dropped. This procedure is repeated at each router and the packet eventually reaches the mobile terminal from the lowest-level router, via a base station.

Packets transmitted by a mobile terminal are processed by routers as follows. When a packet arrives from a lower-level network interface, the route information retrieval unit retrieves route information on the basis of the packet source address. If route information corresponding to the packet source address is thereby found, this route information is updated using the method to be described below, and the packet is forwarded from the higher-level network interface. If the route information retrieval unit fails to retrieve route information on the basis of the packet source address, the packet is dropped.

If a packet that has arrived from a lower-level network interface is a route-update notification packet, the route is updated in accordance with information contained in the update notification. The arrival of packets other than route-update notification packets serves to extend the expiry time of the route information corresponding to the packet source address. A packet sent by a mobile terminal reaches the top level of the network by repetitions of this procedure. If the packet is a route-update notification, it is dropped there. Other packets are forwarded into the external network.

Updating of a route when a mobile terminal has moved is performed as follows. Base stations intermittently transmit a beacon signal giving notification of base station location, identification number, etc. A mobile terminal receives the beacon signal from the base station to which it is connected, and detects when the connected base station changes. A mobile terminal sends a route-update notification packet whenever the connected base station changes. The route-update notification is forwarded by the method described above, thereby updating the route to the mobile terminal. Route information in the routers automatically expires after the elapse of a predetermined time from the update. As long as a mobile terminal continues to send data, the route information in the routers continues to be updated by the passing of the data. When no data is sent, the mobile terminal transmits a route-update notification within a shorter time interval than the expiry time, thereby guaranteeing its accessibility from the external network.

However, the following kinds of problems have been encountered in a conventional system of the sort described above.

Namely, a problem of a conventional system is that forgery and transmission of route-update notifications by a malicious user can result in abnormal functioning of the route control performed in the mobility-supporting network, and in service disturbances.

Although a conventional mobility-supporting network has a hash function based mechanism for protecting update notifications, there are no stipulations regarding how the authentication information (i.e., the key) is distributed. The following problems arise in a system where each router holds in advance all the authentication information, or in other words, where each router holds a different key for each mobile terminal. Namely, management operations such as addition and deletion of authentication information have to be performed more or less simultaneously at all routers; a large number of keys have to be held, which uses a large amount of router memory; and scalability becomes problematic.

Although the aforementioned management problems do not occur in a system where update notifications are authenticated only at the highest-level router, such a system is still problematic in that it takes time to confirm the legitimacy of the update notifications.

SUMMARY OF THE INVENTION

It is an object of the present invention to overcome the aforementioned defects of the prior art; to provide a solution to the problem of scalability in the management of authentication information; and to provide a key distribution system for protecting route-update notifications that achieves a shortening of the time required to confirm legitimacy.

In order to solve the aforementioned problem, according to the first aspect of this invention, it is provided a key distribution system for protecting route-update notifications which distributes, to the routers in a mobile communication network, the authentication information established for each mobile terminal, which is used by the routers to authenticate mobile terminal route-update notifications that are communicated from the mobile terminals after encryption, comprising: a top-level router for managing the authentication information of all mobile terminals and for distributing it in response to requests from the other routers; wherein said other routers comprise route information management means for holding authentication information for the mobile terminals, verifying the route-update notifications communicated from these mobile terminals, and managing their route information; and wherein said route information management means comprises means which, when it receives a route-update notification, if the route information management means does not hold the authentication information corresponding to the originating mobile terminal, requests and acquires the authentication information in question from said top-level router.

The route information management means may comprises: means which, when relaying authentication information sent from the top-level router to the other routers, stores and holds this authentication information; and means which, when relaying an authentication information request sent from a router to the top-level router, if the requested authentication information is being held, sends this held requested authentication information to the router that is the source of the request.

The key distribution system of the present invention may be provided with means for setting the validity period of the authentication information is provided; and the route information management means may comprise: means for extending the validity period by a prescribed period if the authentication information being held has been accessed; and means for deleting the authentication information when the validity period of the held authentication information expires.

According to the second aspect of this invention, it is provided a router in a mobile communication network comprising: means for using authentication information established for each mobile terminal to authenticate mobile terminal route-update notifications that are communicated from mobile terminals after encryption; and route information management means for holding authentication information for the mobile terminals, verifying the route-update notifications communicated from these mobile terminals, and managing their route information; wherein said route information management means includes means which, when it receives a route-update notification, if the route information management means does not hold the authentication information corresponding to the originating mobile terminal, requests and acquires the authentication information in question from the top-level router, where the top-level router manages the authentication information of all mobile terminals and distributes it in response to requests from other routers.

The route information management means may comprise route information management means comprises: means which, when relaying the authentication information sent from the top-level router to the other routers, stores and holds this authentication information; and means which, when relaying an authentication information request sent from a router to the top-level router, if the requested authentication information is being held, sends this held requested authentication information to the router that is the source of the request.

The router may comprise means for setting the validity period of the authentication information is provided; and wherein: said route information management means comprises: means for extending the validity period by a prescribed period if the authentication information being held has been accessed; and means for deleting the authentication information when the validity period of the held authentication information expires.

According to the third aspect of this invention, it is provided a key distribution method for protecting route-update notifications which distributes, to the routers in a mobile communication network, the authentication information established for each mobile terminal, which is used by the routers to authenticate mobile terminal route-update notifications that are communicated from the mobile terminals after encryption, including a route information management step in which routers hold authentication information for the mobile terminals, verify the route-update notifications communicated from these mobile terminals, and manage their route information; and wherein: said route information management step comprises a step in which, when a route-update notification is received, if a router does not hold the authentication information corresponding to the originating mobile terminal, it requests and acquires the authentication information in question from the top-level router, where the top-level router manages the authentication information of all mobile terminals and distributes it in response to requests from routers.

The route information management step may include: a step in which, when the authentication information sent from the top-level router to the other routers is being relayed, this authentication information is stored and held; and a step in which, when an authentication information request sent from a router to the top-level router is being relayed, if the requested authentication information is being held, this held requested authentication information is sent to the router that is the source of the request.

The authentication information may be set a validity period and the route information management step may include: a step of extending the validity period by a prescribed period if the authentication information being held has been accessed; and a step of deleting the authentication information when the validity period of the held authentication information expires.

According to the further aspect of this invention, it is provided a key distribution program for protecting route-update notifications and which controls a computer to distribute, to the routers in a mobile communication network, the authentication information established for each mobile terminal, which is used by the routers to authenticate mobile terminal route-update notifications that are communicated from the mobile terminals after encryption, comprising: executing route information management processing whereby routers hold authentication information for the mobile terminals, verify the route-update notifications communicated from these mobile terminals, and manage their route information; and in said route information management processing, executing processing whereby, when a route-update notification is received, if a router does not hold the authentication information corresponding to the originating mobile terminal, the authentication information in question is requested and acquired from the top-level router, where the top-level router manages the authentication information of all mobile terminals and distributes it in response to requests from routers.

BRIEF DESCRIPTION OF THE DRAWINGS

Specific embodiments of the present invention will now be described, by way of example only, with reference to the accompanying of drawings in which.

DETAILED DESCRIPTION OF THE PREFERRED EMBODIMENTS

A key distribution system for protecting route-update notifications according to this invention manages routes to mobile terminals in the form of soft-states, and updates route information on the basis of route information update notifications (hereinafter, termed simply "update notifications") from mobile terminals. In a packet-based mobility-supporting system that guarantees mobile terminal accessibility, this has the effect of reducing the flow of authentication information required to verify the legitimacy of update notifications, reducing memory use in routers, and improving scalability.

In FIG. 4, which illustrates an exemplary mobility-supporting network according to the present invention, the network comprises, in similar manner to a mobility-supporting network in which conventional technology is applied, top-level router 10, routers (20-1, 20-2, 20-3, 20-4) and base stations (30-1, 30-2); and a connection is assumed between a base station and mobile user terminal 40 located in the communication area of that base station. Mobile terminal 40 and base station 30-1 are connected via radio transmission devices. Mobile terminal 40 transmits and receives data by way of the base stations.

An embodiment of this invention will now be described in terms of the exemplary network illustrated in FIG. 4.

Mobile terminal 40 transmits an update notification at regular intervals to this mobility-supporting network. In the example of FIG. 4, mobile terminal 40 is located within the communication area of base station 30-1 and transmits an update notification at regular intervals to the mobility-supporting network via this base station 30-1. When router 20-3 receives an update notification that has been sent from mobile terminal 40, it requests, from top-level router 10, the authentication information required to authenticate the update notification. In response to this request for authentication information, top-level router 10 sends the relevant authentication information to router 20-3 which issued the request.

A feature of this invention is that each router on the route to router 20-3 (namely, routers 20-1 and 20-2) incorporates and makes use of the authentication information sent by top-level router 10.

Given this situation, if mobile terminal 40 moves into the region of control of base station 30-2, router 20-4 receives an update notification from mobile terminal 40 and transmits an authentication information request to top-level router 10.

In this case, however, because router 20-2, which is a higher-level router than 20-4, is holding the authentication information for mobile terminal 40, this router 20-2 can return the requested authentication information to router 20-4.

This embodiment also provides means for setting the validity period of the authentication information for mobile terminal 40, this authentication information being held by routers 20-1, 20-2, 20-3 and 20-4. Namely, in this embodiment, authentication information held in a router is deleted from the router if it has not been accessed within its validity period; whereas, if the authentication information has been accessed within its validity period, processing is performed to extend its validity period.

Thus, in this invention, routers through which authentication information is forwarded incorporate and make use of this authentication information, so that routers on a route can respond to subsequent requests for authentication information for the mobile terminal in question. This enables a reduction to be made in the number of times a request for authentication information is sent to top-level router 10, which serves to reduce the bandwidth taken up by such requests and the load on top-level router 10.

Because routers are able to receive authentication information distributed from top-level router 10 when required, routers (other that top-level router 10) do not need to hold authentication information for all the mobile terminals. Hence routers can use less memory than in a system where each router holds all the authentication information. Moreover, addition, alteration and deletion of authentication information only have to be performed in one place, namely, in top-level router 10.

Next, the functions and processing of each node in this embodiment will be described in greater detail with reference to the drawings.

Firstly, in the example of FIG. 4, mobile terminal 40 transmits an update notification to nearby base station 30-1, and base station 30-1 forwards the update notification to higher-level router 20-3.

Mobile terminal 40 also signs the notification, using an electronic signature generated by a hash function or public key encryption. The key (hereinafter, referred to as the "authentication information") used for the signature is held by mobile terminal 40 and top-level router 10.

Figure 1:
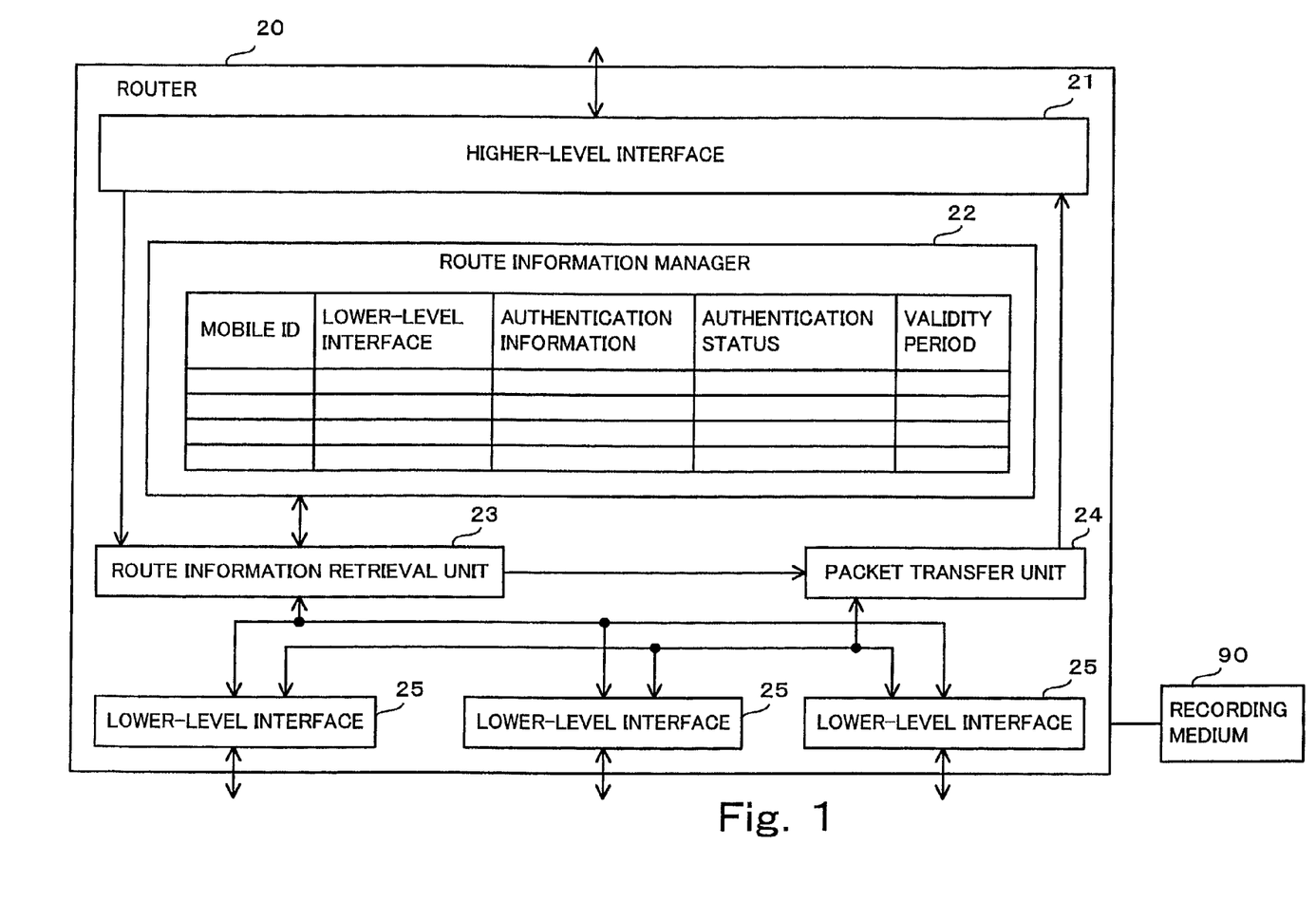
FIG. 1 is a block diagram showing the constitution of routers according to an embodiment of the invention.

FIG. 1 is block diagram showing the constitution of router 20 according to this embodiment. The routers of FIG. 4 are constituted as shown in FIG. 1 and comprise higher-level interface 21 for connecting to a higher-level node; route information manager 22 for managing route information; route information retrieval unit 23 for retrieving route information; packet transfer unit 24 for processing packet transfers; and lower-level interfaces 25 for connection with lower-level nodes.

When router 20 receives an update notification from mobile terminal 40 via one of the router's lower-level interfaces 25, route information retrieval unit 23 passes this notification to route information manager 22 and performs processing relating to route-update notifications. Route information manager 22 manages route information (such as address of the mobile terminal, identifier of the link to which the mobile terminal is connected, validity period of the route information, authentication information, authentication status, etc.), and verifies whether the received route-update notification is valid. If its validity is verified, route information manager 22 registers and updates the route information, and the update notification is forwarded to a higher-level router from higher-level interface 21. On the other hand, if the received route-update notification is invalid, it is discarded.

In this embodiment, if authentication information is not held for the mobile terminal in question, an authentication information request is sent to top-level router 10, and router 20 waits until it receives the authentication information (or notification that there is no relevant authentication information) from top-level router 10. At each router, authentication information is managed along with route information, and is deleted when the validity period of the route information has elapsed.

Figure 2:
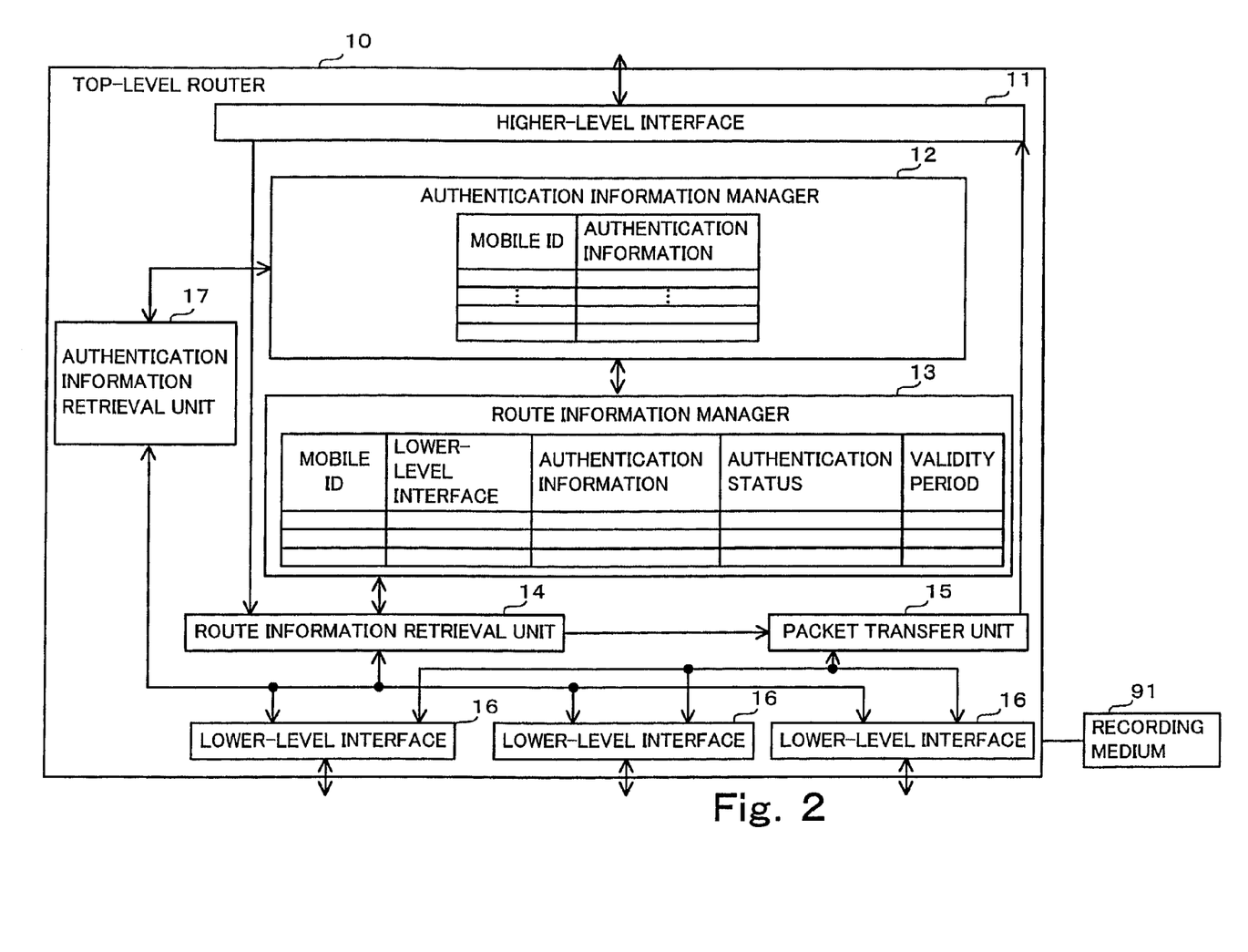
FIG. 2 is a block diagram showing the constitution of the top-level router according to an embodiment of the invention.

FIG. 2 is block diagram showing the constitution of top-level router 10 according to this embodiment.

Top-level router 10 comprises higher-level interface 11; authentication information manager 12 for managing authentication information; route information manager 13; route information retrieval unit 14; packet transfer unit 15; lower-level interfaces 16; and authentication information retrieval unit 17 for retrieving authentication information.

When top-level router 10 receives an update notification from mobile terminal 40 via one of the router's lower-level interfaces 16, route information retrieval unit 14 passes this notification to route information manager 13 and performs processing relating to route-update notifications.

Route information manager 13 manages route information (such as address of the mobile terminal, identifier of the link to which the mobile terminal is connected, validity period of the route information, authentication information, authentication status, etc.), and verifies whether the received route-update notification is valid. If its validity is verified, route information manager 22 registers and updates the route information. On the other hand, if the received route-update notification is invalid, it is discarded.

If route information manager 13 does not hold authentication information for the mobile terminal in question, it checks whether authentication information for that terminal is held in authentication information manager 12. If it is held there, the processing described in the previous paragraph is performed. If it is not held there, the update notification is discarded.

When top-level router 10 receives an authentication information request from a router of a lower-level router group (20-1, 20-2, 20-3, 20-4), authentication information retrieval unit 17 checks whether authentication information for the mobile terminal in question is held in authentication information manager 12. If it is held there, the authentication information is sent to the router that requested it. If the authentication information is not held in authentication information manager 12, top-level router 10 sends, to the router that requested the information, a message to the effect that there is no relevant authentication information.

When router 20 that issued the authentication information request receives the requested authentication information from top-level router 10, it stores it in route information manager 22. At the same time, a predetermined validity period for the authentication information is stored, and the authentication information is deleted if it is not accessed within this validity period. However, if the authentication information in router 20 is accessed, or if router 20 receives a response to a request it has sent to top-level router 10 for authentication information, within the validity period, the validity period is updated.

If router 20 that issued the request for authentication information receives from top-level router 10 a response to the effect that there is no relevant authentication information, it discards the update notification.

Other routers 20-1 and 20-2 lying along the route relay the authentication information from top-level router 10, and when these routers 20-1 and 20-2 along the route forward this authentication information, they also store it in route information manager 22.

Figure 3:
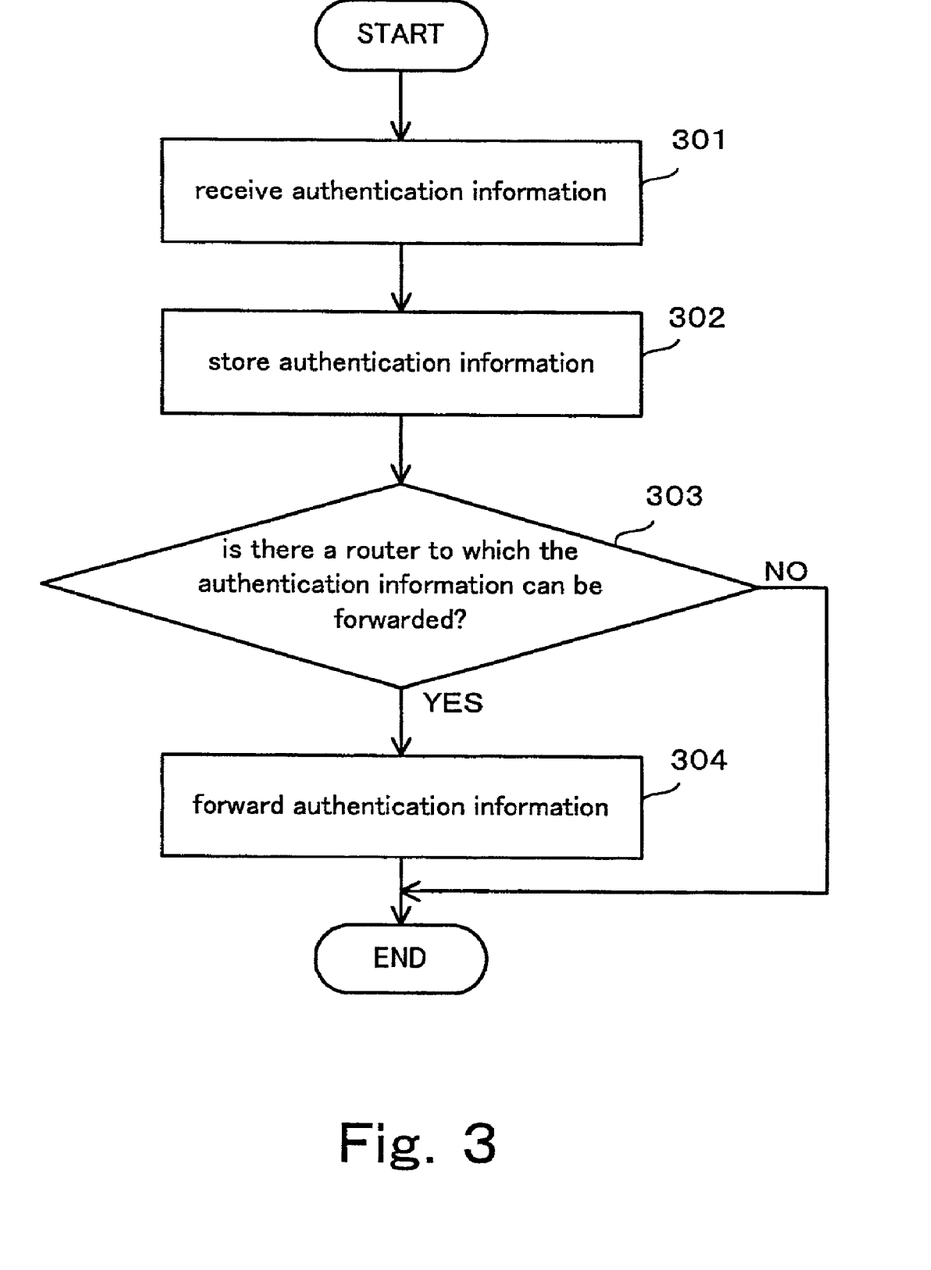
FIG. 3 is a flowchart showing how a router deals with authentication information according to an embodiment of the invention.

FIG. 3 is a flowchart showing how router 20 deals with authentication information according to this embodiment. If router 20 receives authentication information from top-level router 10 (Step 301), it stores it (Step 302). If the destination of this authentication information is another router (Step 303), router 20 forwards the authentication information to the destination in question (Step 304).

A router 20 lying on the route thus stores forwarded authentication information and deals with stored authentication information in the same manner as described above. Due to such processing, authentication information can be distributed to a plurality of routers 20-1, 20-2 and 20-3 on the route as a result of a single request.

Each router 20 also monitors authentication information requests from other routers to top-level router 10. If a given router 20 detects a request that has been issued by another router for authentication information that is currently being stored by router 20 itself, router 20 sends the authentication information that it is storing to the router that has made the request, and does not forward the authentication information request to top-level router 10.

Given the foregoing features, this embodiment solves the problem of scalability encountered in authentication information management, and achieves a shortening of the time required to confirm legitimacy.

In the key distribution system for protecting route-update notifications of this embodiment, the authentication information and route information management functions of routers 20, the authentication information distribution function of top-level router 10, and other functions, can of course be implemented by hardware. However, a key distribution system for protecting route-update notifications according to this embodiment can also be implemented by loading, into the memory of a computer processor, a computer program that provides these functions. This computer program can be stored in recording media 90 and 91, which can be magnetic disks, semiconductor memory, etc. The various functions mentioned above are implemented by loading the program into the computer processor from these recording media and controlling the operation of the computer processor.

The present invention has been described above in terms of a preferred mode of embodiment and exemplary embodiments, but it is not restricted to these and can be carried out in a variety of modified forms within the scope of its technical ideas.

As has been described above, the following advantages are attained by means of this invention.

Firstly, update notifications can be protected by electronic signatures; and the number of requests for authentication information and the time taken to verify an update notification can be reduced by making use of the fact that the route followed by a request for authentication information coincides with the route over which the update notification is sent.

Secondly, because only authentication information for which there has been a request is taken into routers (other than top-level router 10), and because this authentication information is deleted if it is not accessed within a prescribed time, the amount of memory used in the routers (and in particular, in lower-level routers) can be reduced.

What is claimed is:

1. A key distribution system for protecting route-update notifications which distributes, to the routers in a mobile communication network, the authentication information established for each mobile terminal, which is used by the routers to authenticate mobile terminal route-update notifications that are communicated from the mobile terminals after encryption, comprising:
   a top-level router for managing the authentication information of all mobile terminals and for distributing the authentication information in response to requests from other routers connecting the top-level router to a first router closest to an originating mobile terminal;
   wherein each of said other routers, in a routing path intermediate the top-level router and the first router, comprises route information management means for holding authentication information for the mobile terminals, verifying the route-update notifications communicated from the originating mobile terminal, and managing the route information; and
   wherein said route information management means comprises means which, when receiving a route-update notification, makes a determination if the authentication information corresponding to the originating mobile terminal is held, and if the route information management means does not hold the authentication information corresponding to the originating mobile terminal, requests and acquires the authentication information in question from said top-level router.

2. The key distribution system for protecting route-update notifications claimed in claim 1, wherein:
   said route information management means comprises:
   means which, when relaying authentication information sent from the top-level router to the other routers, stores and holds this authentication information; and
   means which, when relaying an authentication information request sent from a router to the top-level router, if the requested authentication information is being held, sends this held requested authentication information to the router that is the source of the request without further sending the authentication information request to the top-level router.

3. The key distribution system for protecting route-update notifications claimed in claim 2, wherein:
   means for setting the validity period of the authentication information is provided; and
   said route information management means comprises:
   means for extending the validity period by a prescribed period if the authentication information being held has been accessed; and
   means for deleting the authentication information when the validity period of the held authentication information expires.

4. A router in a mobile communication network comprising:
   means for using authentication information established for each mobile terminal to authenticate mobile terminal route-update notifications that are communicated from mobile terminals after encryption; and
   route information management means for holding authentication information for the mobile terminals, verifying the route-update notifications communicated from these mobile terminals, and managing their route information;
   wherein said route information management means includes means which, when it receives a route-update notification, if the route information management means is determined not to hold the authentication information corresponding to the originating mobile terminal, requests and acquires the authentication information in question from a connected router containing the authentication information located prior to the top-level router, where the top-level router manages the authentication information of all mobile terminals and distributes it in response to requests from other routers.

5. The router claimed in claim 4, wherein said route information management means comprises:
   means which, when relaying the authentication information sent from the top-level router to the other routers, stores and holds this authentication information; and
   means which, when relaying an authentication information request sent from a router to the top-level router, if the requested authentication information is being held, sends this held requested authentication information to the router that is the source of the request without requesting the information from the top-level router.

6. The router claimed in claim 5, wherein:
   means for setting the validity period of the authentication information is provided; and wherein:
   said route information management means comprises:
   means for extending the validity period by a prescribed period if the authentication information being held has been accessed; and
   means for deleting the authentication information when the validity period of the held authentication information expires.

7. A key distribution method for protecting route-update notifications which distributes, to the routers in a mobile communication network, the authentication information established for each mobile terminal, which is used by the routers to authenticate mobile terminal route-update notifications that are communicated from the mobile terminals after encryption, including:
   a route information management step in which routers hold authentication information for the mobile terminals, verify the route-update notifications communicated from these mobile terminals, and manage their route information;
   wherein said route information management step includes a step in which, when a route-update notification is received, if a router is determined not to hold the authentication information corresponding to the originating mobile terminal, it requests and acquires the authentication information in question from a connected router containing the authentication information located prior to the top-level router, where the top-level router manages the authentication information of all mobile terminals and distributes it in response to requests from routers.

8. The key distribution method for protecting route-update notifications claimed in claim 7, wherein said route information management step includes:
   a step in which, when the authentication information sent from the top-level router to the other routers is being relayed, this authentication information is stored and held; and
   a step in which, when an authentication information request sent from a router to the top-level router is being relayed, if the requested authentication information is being held, this held requested authentication information is sent to the router that is the source of the request.

9. The key distribution method for protecting route-update notifications claimed in claim 8, wherein:
said authentication information is set the validity period; and wherein: said route information management step includes:
a step of extending the validity period by a prescribed period if the authentication information being held has been accessed; and
a step of deleting the authentication information when the validity period of the held authentication information expires.

10. A program storage medium readable by a computer, tangibly embodying a key distribution program of instructions executable by the computer to control the computer to function for protecting route-update notifications and which controls the computer to distribute, to the routers in a mobile communication network, the authentication information established for each mobile terminal, which is used by the routers to authenticate mobile terminal route-update notifications that are communicated from the mobile terminals after encryption, comprising:
executing route information management processing whereby routers within a routing path intermediate a top-level router and a first router closest a mobile terminal each hold authentication information for the mobile terminals, verify the route-update notifications communicated from these mobile terminals, and manage their route information; and
in said route information management processing, executing processing whereby, when a route-update notification is received, if a router in the routing path intermediate the top-level router and the first router is determined not to hold the authentication information corresponding to the originating mobile terminal, the authentication information in question is requested and acquired from the top-level router, where the top-level router manages the authentication information of all mobile terminals and distributes it in response to requests from routers.

11. The program storage medium of claim 10, comprising, in said route information management processing, executing processing whereby:
when the authentication information sent from the top-level router to the other routers is being relayed, this authentication information is stored and held; and
when an authentication information request sent from a router to the top-level router is being relayed, if the requested authentication information is being held, this held requested authentication information is sent to the router that is the source of the request.

12. The program storage medium of claim 11, wherein means for setting the validity period of the authentication information is provided; and comprising, in said route information management processing, executing processing whereby:
the validity period is extended by a prescribed period if the authentication information being held has been accessed; and
the authentication information is deleted when the validity period of the held authentication information expires.

13. A key distribution method for protecting route-update notifications which distributes, to the routers in a mobile communication network, the authentication information established for each mobile terminal, which is used by the routers to authenticate mobile terminal route-update notifications that are communicated from the mobile terminals after encryption, including:

a route information management step in which a base station has been in radio transmission with an originating mobile terminal, the base station being connected to a first router, and via plural subsequent routers to a top-level router, wherein each of the top-level router, the first router, and the plural subsequent routers holds authentication information for the originating mobile terminal that has been previously provided from the top-level router responsive to a prior authentication information request by the first router; and
responsive to a route-update notification received from a requesting router, if a router of the plural subsequent routers receives the route-update notification and is determined to hold the authentication information corresponding to the originating mobile terminal, that router responds with the authentication information in question, without requesting the authentication information from the top-level router, and distributes the held authentication information to the requesting router.

14. The method of claim 13, wherein,
another base station makes radio transmission connection with the originating mobile terminal, the another base station connected to a second router, and via the plural subsequent routers to the top-level router,
upon a route-update notification being received from the second router, if a router of the plural subsequent routers receives the route-update notification and does hold the authentication information corresponding to the originating mobile terminal, that router responds with the authentication information in question, without requesting the authentication information from the top-level router, and distributes the held authentication information to the second router for holding in each router in the routing path from that router to the second router.

15. An authentication information distribution system in a packet-based mobile terminal system, comprising:
a top-level router;
plural base stations; and
plural routers, the plural routers, one through another, connecting each of the base stations to the top-level router, wherein,
a first base station, in communication connection with a mobile user terminal, receives an update notification from the terminal and transmits a request for authentication information, required to authenticate the update notification, to the top-level router via a first router connected to the first base station and via the plural routers connecting the first router to the top-level router, and
each of the plural routers, connecting the first router to the top-level router, that receives the request for authentication information, i) determining if the requested authentication information corresponding to the terminal is already stored within that router, ii) upon determining the authentication information is already stored, sending the authentication information already stored to the first base station without requesting the authentication information from the top-level router, and iii) if the authentication information is determined not to be already stored, requesting the authentication information from the top-level router.

* * * * *